United States Patent [19]

Taibl

[11] 3,916,090

[45] Oct. 28, 1975

[54] INTRACOMMUNICATION SYSTEM FOR A COMMUNICATIONS TERMINAL

[75] Inventor: Allen F. Taibl, Mount Prospect, Ill.

[73] Assignee: Teletype Corporation, Skokie, Ill.

[22] Filed: Apr. 8, 1974

[21] Appl. No.: 458,614

[52] U.S. Cl. .................... 178/4.1 R; 178/2 R; 178/3

[51] Int. Cl.[2] .............................................. G06F 3/14

[58] Field of Search ............ 178/68, 17 R, 2 R, 2 B, 178/2 C, 2 D, 2 E, 3, 4.1 R; 340/324 AD; 325/38 R

[56] References Cited

UNITED STATES PATENTS

| | | | |
|---|---|---|---|
| 3,374,309 | 3/1968 | Elich et al. | 178/2 R |
| 3,502,808 | 3/1970 | Brown, Jr. | 178/3 |
| 3,623,068 | 11/1971 | Horgan et al. | 178/4.1 R |

*Primary Examiner*—Thomas A. Robinson
*Attorney, Agent, or Firm*—W. G. Dosse; J. L. Landis

[57] ABSTRACT

A telecommunications terminal which is divided into at least two portions; specifically, a keyboard portion and a central portion with a display and a memory, in which the depression of a key on the keyboard causes a multilevel binary code combination or character to be generated and transmitted seriatim from the keyboard portion of the terminal with an additional binary 1 state bit to indicate to the central portion of the terminal that the remainder of the code combination is a data signal. The central portion of the terminal recognizes the presence of that additional bit and steers the signal to a data input bus whereby the data are recognized and processed according to the specific character. Similarly, data can be sent back to the keyboard from the central portion, for example, to light keyboard lamps for indication to the keyboard operator. The central portion delivers the data to a data bus which loads a shift register along with an additional binary 1 state bit to indicate that the code combination character signal constitutes data. This is transmitted to the keyboard and energizes lamp control circuitry at the keyboard. Conversely, supervisory signals are sent to the keyboard by sending appropriate signals to a control output bus from the central portion. These control signals are loaded into the output shift register with an additional binary 0 state bit to label the code combination as a control rather than data signal. Similarly, supervisory indications or signals can be sent from the keyboard to the central portion of the terminal as to the status of the keyboard and its operation.

7 Claims, 5 Drawing Figures

INTRACOMMUNICATION SYSTEM FOR A COMMUNICATIONS TERMINAL

FIELD OF THE INVENTION

This invention relates to communications systems within a communications terminal and more particularly to a system for transmitting data and supervisory signals between one portion and another portion of a terminal along the same transmission channel without confusing which transmission is data and which transmission is supervisory.

BACKGROUND OF THE INVENTION

In simpler terminals, even terminals having punches, tape readers, printers, and keyboards, all in one cabinet, control of the various portions of the terminal and the data transmission within the terminal itself can be controlled rather simply by wired or mechanical transmission paths, either serial or simultaneous. Manual control can be exercised over all portions of the unit. However, as terminals become more complicated, and in order to promote versatility of these terminals, mechanical and hard wiring interconnections for data and control or supervisory signaling becomes cumbersome, awkward, and limits the design flexibility of the system. Also, such interconnections will limit the flexibility of remote portions of the terminal. For example, it may not be feasible to put a tape unit in one room, a keyboard and display unit in another room and a printer at the far end of the factory. While these portions of the terminal may be remote from one another, they still constitute a single terminal for the generation, storage, recall, display, and print-out of data as well as its transmission across the country. These interconnections can be reduced to seriatim transmission of the data. However, previously the supervisory transmission was done exclusively on a multiwire, simultaneous basis which can be rather cumbersome and expensive when threading remote units about a large installation. Additionally, simultaneous transmission has been limited in the distances permitted due to the low signaling levels inherent in the latest signaling standards promulgated among the communications industry.

It is an object of the present invention to reduce the number of conductors needed to interconnect the various portions of a telecommunications terminal.

It is another object of the invention to permit wider separation between the portions of a telecommunications terminal.

SUMMARY OF THE INVENTION

In accordance with the present invention, transmission of data and supervisory signals from one portion of a telecommunications terminal to another portion of the same telecommunications terminal is accomplished by inserting into each transmission code combination an additional bit which indicates by its binary state whether the code combination constitutes data or supervisory signals, thereby permitting a single full duplex transmission channel to accomplish the complete interconnection of the portions of a terminal including all control, status, and data signals.

BRIEF DESCRIPTION OF THE DRAWING

A more thorough understanding may be had by careful consideration of the following detailed description when considered in conjunction with the accompanying drawings wherein.

DETAILED DESCRIPTION

Figures 1A, 3:
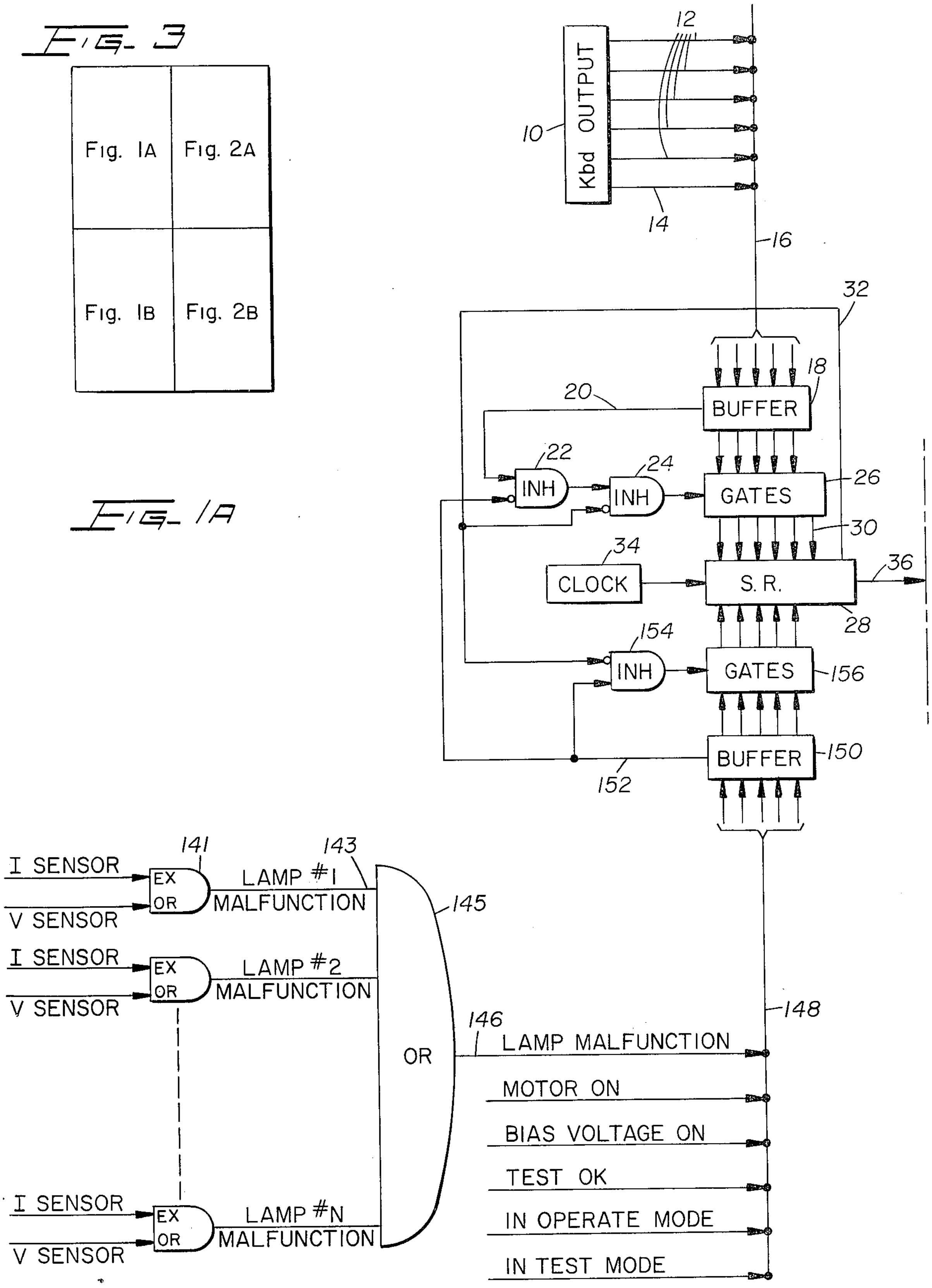
FIG. 3, located on the same sheet as FIG. 1A, is a diagram showing the arrangement of FIGS. 1 and 2.
Figure 1B:
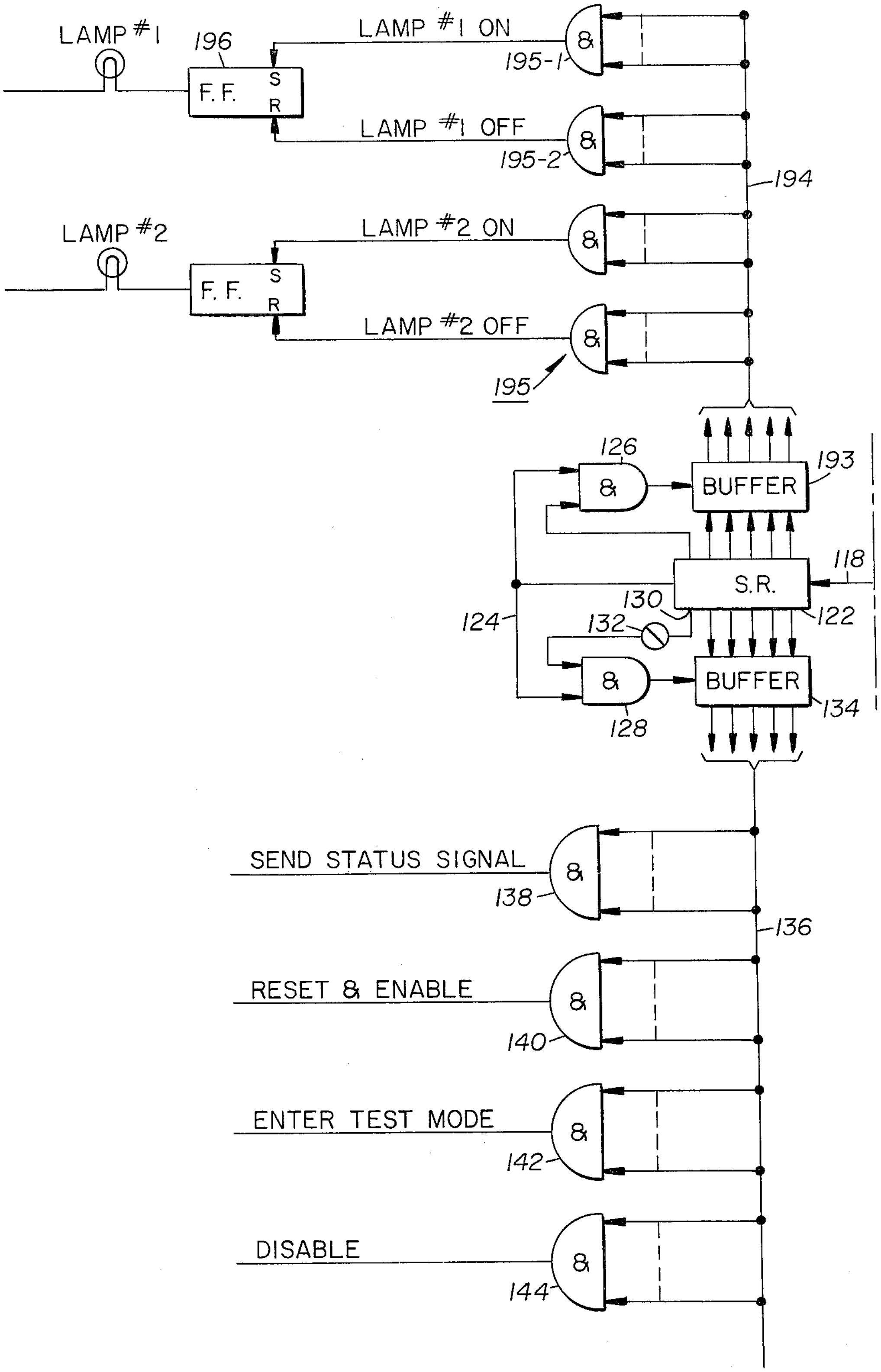
FIG. 1 (parts A and B) illustrates a simplified diagram of an exemplary keyboard portion of a telecommunications terminal with transmission out and in to the keyboard on a single full duplex transmission channel.

Referring now to the accompanying drawings and more particularly to FIG. 1, a keyboard portion of a telecommunications terminal is illustrated in its simplest form. Such a keyboard might possibly be of the type shown in U.S. Pat. No. 3,171,890 granted on Mar. 2, 1965, to L. C. Anderson, Jr. et al. in which the depression of a key on a keyboard closes selected ones of a plurality of simultaneous output contacts, dependent upon the particular key depressed. Such keyboard output from a depression of a selected key is indicated graphically in FIG. 1 by a block designated "Kbd output" 10. The keyboard output 10 is shown issuing signals on six parallel wires, five of them designated by the reference number 12 that comprise data wires and the sixth wire 14 comprising a universal output wire which experiences a contact closure each time that a new code combination is available on the wires 12.

The wires 12 are shown as only being five in number in FIG. 1; however, it will be readily recognized by one skilled in the art that six, eight or any number of wires are possible from a keyboard output 10 depending upon the system with which the keyboard is used. The signal output wires 12 carry a different permutation of binary bits for each key depressed no matter if that key represents an alphanumeric character or a command character for affecting the mode of operation of the system. The wires 12 would also carry different permutations of binary bits for additional keys such as might be used on a cathode ray tube display to raise a cursor, lower a cursor, etc.

Depression of keys on such an elaborate, electronic keyboard would also generate signals on the wires 12 although perhaps not by the closure of simple contacts. A more elaborate keyboard system is shown in the copending U.S. Pat. application of R. E. Marin, No. 420,124, filed on Nov. 29, 1973, and in a joint application of R. E. Marin and R. K. Simonson, Ser. No. 420,123, also filed on Nov. 29, 1973.

The wires 12 and 14 are connected to a multiconductor data output bus 16 which is shown having no inputs other than the keyboard output 10, but which might conceivably have other inputs in systems apparent to one skilled in the art. The data output bus 16 terminates at the inputs to a data output buffer register 18 in which the five wires 12 of the keyboard output 10 ultimately provide the inputs to the various stages of the buffer 18. The universal output on the wire 14 is used to energize or trigger the buffer 18 to record and thus store the signals present on the wires 12. When a permutation -code- combination character signal is present in the buffer 18, a character-available output signal - binary 1 is herein understood to designate a single level output - is produced on the character available wire 20 which indicates the presence of that code combination in the buffer 18.

Assuming, for the moment, no inhibiting condition to the progress of the code combination present in the buffer 18, an inhibit gate 22 passes the character-available signal on the wire 20 to a second inhibit gate 24 which also passes the character-available signal to the input of a plurality of gates or a gating system 26. The gating system 26 is illustratively a bank of AND-gates which is used to couple the outputs from the buffer 18 through to the input of a shift register 28 whenever the inhibit gate 24 passes a character available signal.

It will be observed that the output of the gating system 26 provides one output level 30 in addition to the outputs derived from the buffer 18. This additional output 30 is, for example, a wired AND-gate which will produce a binary 1 state signal whenever the gates 26 are energized to pass a code-combination character signal from the buffer 18 to the shift register 28. This means that when a code combination is loaded into the shift register 28 from the buffer 18, it will carry an additional binary 1 state bit from the output 30. As soon as a code combination has been loaded into the shift register 28, a signal (binary 1 ) is sent on a wire 32 which indicates that the shift register 28 is not in condition to receive further information. The signal on the wire 32 can be derived, for example, from an AND-gate monitoring all of the stages of the shift register 28 so as to indicate any OFF IDLE condition, as is well known to one skilled in the data communications art. The wire 32 is connected to the inhibit input of the inhibit gate 24 and thus the signal on the wire 32 will inhibit further data character-available signals from passing through the inhibit gate 24 until such time as the shift register 28 is completely unloaded.

As soon as the shift register 28 has been loaded, pulses derived from a clock 34 cause the information contained in the shift register 28 to be advanced to the right in FIG. 1 to an output channel 36 which is coupled to a central portion of the telecommunications terminal.

CENTRAL PORTION DATA IN

Figure 2A:
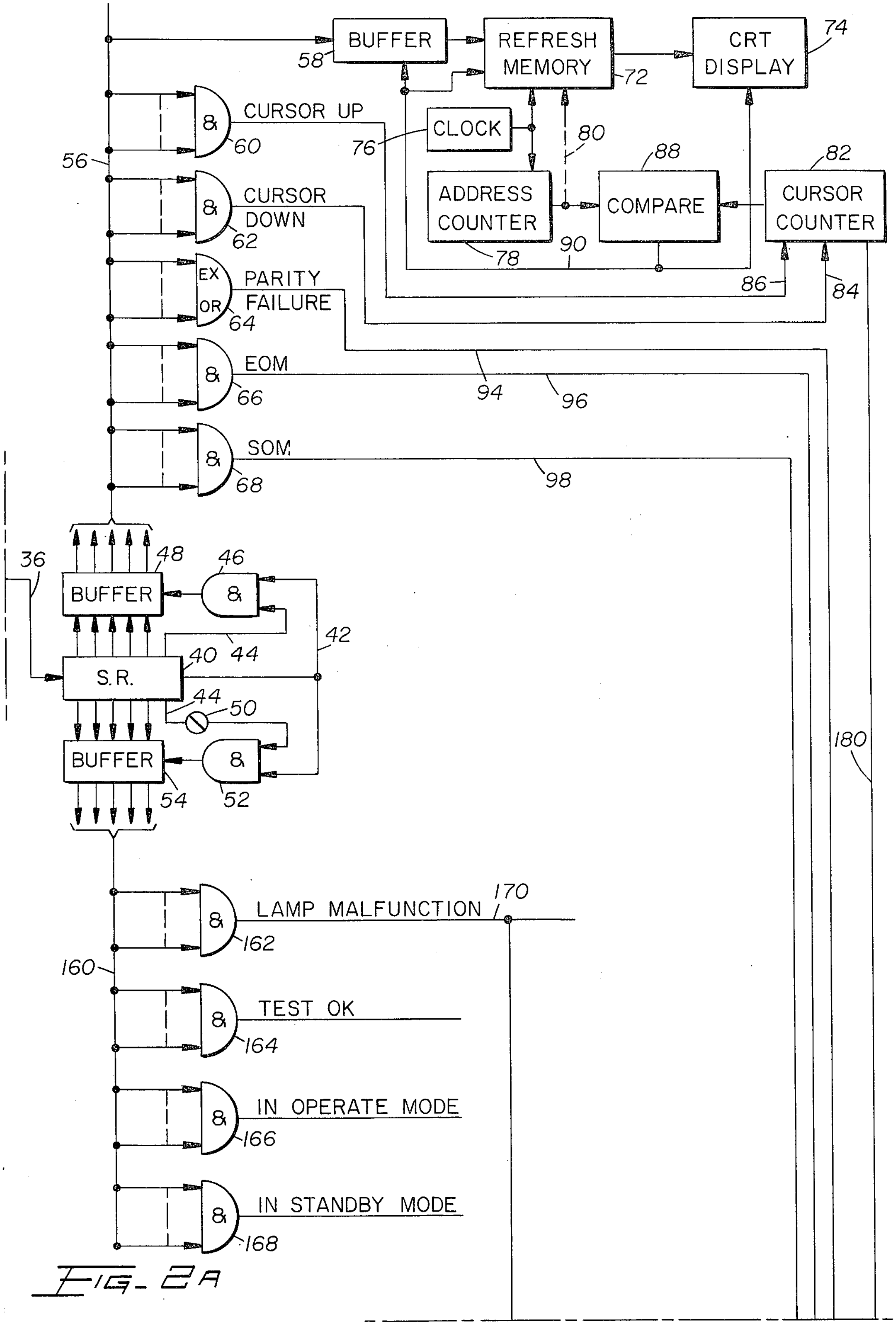
FIG. 2 (parts A and B) illustrates in simplified, exemplary form a central and display portion of a telecommunications terminal capable of communicating with other peripheral portions of the terminal including the keyboard of FIG. 1 over a single full duplex transmission channel.
Figure 2B:
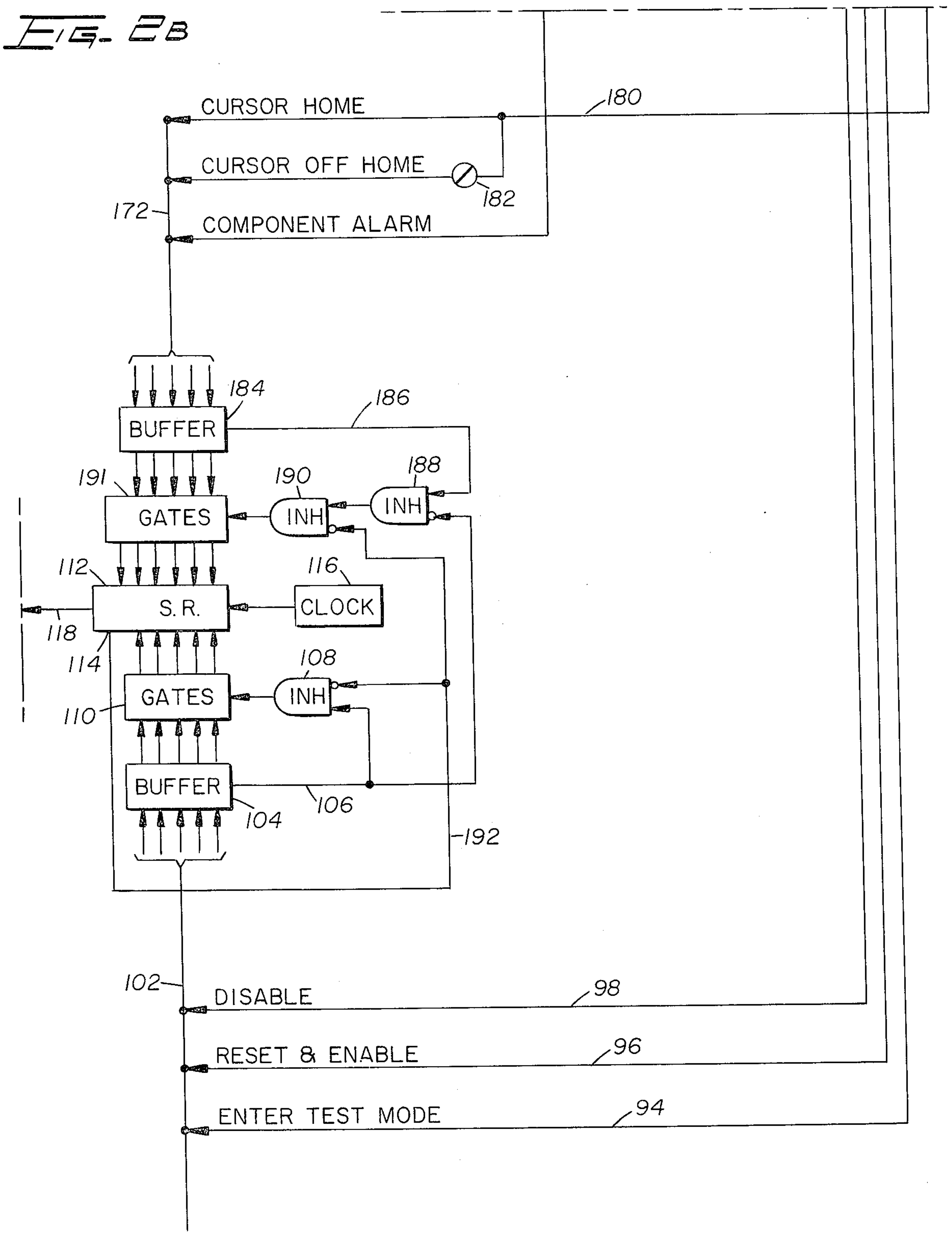

Referring now to FIG. 2, the central portion of a telecommunications terminal is illustrated with a simplified schematic diagram of a cathode ray tube display and some interconnections between the various parts of the central portion of the terminal in greatly simplified form for purposes of illustrating the intra-terminal communications system of the present invention. Specifically, the channel 36 is coupled to the input of a shift register 40 in FIG. 2 and as information is received on the channel 36, it is shifted to the right in FIG. 2 until it fills the shift register 40, at which time a character-available signal is sent on the wire 42. This character-available signal on the wire 42 is an indication that the shift register is full and ready to unload into a buffer.

Since the information contained in the shift register 40 was derived ultimately from the buffer 18 of FIG. 1, it contained a binary 1 state signal in the additional one of its combination levels and this binary 1 state signal is coupled over wire 44 to an AND-gate 46. Therefore, the combination of the binary 1 state signal on the wire 44 and the character-available signal on the wire 42 is recognized by the AND-gate 46 which issues a load signal to a buffer 48, causing it to load the code combination then present in the shift register 40. The additional or steering binary 1 state bit, having served its purpose is then destroyed.

The same wire 44 is also connected to an inverter 50. Therefore, when a binary 1 state signal is present on the wire 44, an AND-gate 52 is de-energized, preventing the incoming information from being loaded into an alternative incoming status buffer register 54.

The data present in the buffer 48 is delivered to a data input bus 56 of the central portion of the telecommunications terminal illustrated in FIG. 2. Data from the keyboard portion of FIG. 1 is delivered principally through a display buffer 58 for use by a cathode ray tube display circuit, preferably of the type disclosed in U.S. Pat. No. 3,609,749, granted on Sept. 28, 1971, to W. B. McClelland. Additional circuitry is provided to recognize other command-type data signals which might be present on the data input bus 56. Examples of such additional circuitry includes a series of gates which are shown including an AND-gate 60, which recognizes a data character from the keyboard and which is used to cause a cursor of the cathode ray tube display to rise on the face of the cathode ray tube. Similarly, an AND-gate 62 is used to recognize a code signal generated by a key lever of the keyboard and which is intended to lower the cursor on the face of the cathode ray tube. A circuit component designated simply by the reference number 64 is an exclusive OR-gate tree circuit of the type used commonly by those skilled in the data communications art to generate a vertical parity check bit or if the check bit is one input of the tree, to recognize a failure of vertical parity in a received permutation code combination or character. Two other AND-gates 66 and 68 are used principally when peripheral portions in addition to or other than a keyboard are connected to the channel 36, such, for example, as magnetic tape units, etc. These two AND-gates 66 and 68 recognize, respectively, end-of-message code combinations, and start-of-message code combinations.

DISPLAY CIRCUIT

The buffer 58 was designated as being a portion of a simplified cathode ray tube display circuit and, in fact, provides the input to a refresh memory 72 for a CRT display 74. The refresh memory 72 can be of any number of types, such, for example, as a recirculating shift register, as in the case of the abovementioned McClelland patent, or even a random-access, addressable memory such, for example, as that used in the copending application of G. C. Zobel, Ser. No. 414,580, filed on Nov. 9, 1973, and a joint application by K. W. Turner and G. C. Zobel, Ser. No. 437,257, filed on Jan. 28, 1974.

In grossly simplified form such a cathode ray tube system, as connected to the data input bus 56, is operated by a clock 76 which, in the case of a recirculating refresh memory 72, causes the memory to advance at a regular clock interval in synchronism with the sweep of a cathode ray tube of the display 74. The output of the clock is also delivered to an address counter 78 which is no more than a binary counter, that keeps track of the location of data as it circulates in the shift register refresh memory 72.

However, if the refresh memory 72 is of the randomaccessible type, rather than of the recirculating type, the output of the clock 76 does not go to the refresh memory except perhaps for timing purposes, but principally the address for the refresh memory is derived from the address counter 78 and is fed to the address inputs of the refresh memory 72 along a wire 80 (actually a bundle of wires or channels) which is illustrated in dotted lines in FIG. 2. The reason for dotting the conductor 80 is to indicate the alternative nautre of the interconnection.

In order to control the loading of the refresh memory 72, a cursor counter 82 is provided. The cursor counter 82 is an UP-DOWN or bidirectional binary counter which is advanced by a signal on an input wire 84 which is derived from the cursor DOWN AND-gate or from a reverse count signal on a wire 86 which is derived from the cursor UP AND-gate 60.

A comparison circuit 88 compares the output of the address counter 78 with the output of the cursor counter 82 to issue a comparison signal on a wire 90 when the cathode ray tube display 74 is tracing the cursor location. The binary 1 state signal on the wire 90 is delivered to the CRT display 74 so as to cause the CRT display to generate the cursor symbol which, in the case of the abovementioned McCelland patent, is an inversion of the raster signal for that character in order to form the character as an inverted image at the cursor location. It will be evident to one of ordinary skill in the art that any cursor designation known in the art is compatible with the output on the wire 90.

The wire 90 also delivers the comparison signal to the buffer 58 and to the refresh memory 72 to cause the contents of the buffer to be loaded into the refresh memory 72 to cause the contents of the buffer to be loaded into the refresh memory 72 at the location then present, in the case of a recirculating memory, or at the location designated by the address on the wire 80, in the case of a random access memory. The same comparison signal on the wire 90 is also delivered to the buffer 58 in order to clear the first stage of the buffer and permit the contents of the buffer to advance by one stage. The buffer 58 is preferably several multiple-bit or multiple-level stages of the type that will automatically advance code combinations from its input to its output.

CONTROL OUTPUT

Referring again to FIG. 2, the outputs of the exclusive OR-gate tree 64 and the AND-gates 66 and 68 are present on three wires 94, 96, and 98, respectively. The wires 94, 96, and 98 are merely shown entering the control output bus 102. However, one skilled in the art will realize that the central portion of the terminal illustrated in FIG. 2 is very simplified so as only to illustrate the operation of the present intraterminal communication of data and supervisory signals. It will be understood that the central portion would normally have considerable information handling capability as required by a modern telecommunications terminal. This information handling capability might be in the form of wired logic or even stored-program, general-purpose logic. To eliminate description essentially extraneous to the present invention, but yet to illustrate in the simplest, exemplary manner the vast amount of data and supervisory signals that must circulate between the several portions of a modern, highly versatile telecommunications terminal, the most rudimentary logic interconnections have been shown and described. Referring again to FIG. 2, the wire 94 is labeled ENTER TEST MODE since at this point a failure of parity recognized by the exclusive OR-gate tree 64 will indicate that something is wrong. It is then desired to tell the keyboard to enter its test mode to find out if there is anything seriously wrong with the keyboard or its circuitry.

If the AND-gate 68 recognizes the start-of-message code combination character from some other peripheral portion of the telecommunications terminal, a binary 1 state signal is sent on wire 98. As the signal on the wire 98 enters the control output bus, it is a "disable" signal sent to the keyboard to disable the keyboard so that the keyboard cannot transmit to the buffer 58 during such time that the other peripheral unit may be transmitting to the buffer 58.

Similarly, when the message from the other peripheral unit, such as a tape recorder or other data playback unit is recognized by the AND-gate 66, an end-of-message signal is sent on the wire 96. As the signal on the wire 96 enters the control output bus 102, it is an instruction to the keyboard to "reset and enable" since the transmission from the other peripheral units to the buffer 58 has terminated; and the buffer 58 is now again available for the receipt of data from the keyboard output 10 of FIG. 1.

The entry of the wires 94, 96, and 98 into the control output bus 102 is shown as simply one wire entering the bus. In a very limited and simple system, such entry could merely be a simple wired connection with a binary 1 state signal on, for example, the wire 94 resulting in a binary 1 state signal on the bit or level number 1 of the code combination, with all the other bits of that code combination being binary 0 bits. Similarly, the "reset-and-enable" signal on the wire 96 could result in a binary 1 state signal on the number two bit of the control code combination character with all of the other bits of that character being in the binary 0 state.

In a more complicated system, fan-out gates, which are substantially reverse OR-gates, could be used to generate permutation-code combination characters for the binary 1 state signals on any one of the wires 94, 96, and 98, thereby permitting a repertoire of a very large number of control signals to be entered into the bus 102. The control output bus 102 is connected to the input of a control output buffer register 104. A universal wire must also be connected to the set input (not shown) of the buffer 104 in order to indicate to the buffer 104 when information is available on the bus 102. Such a universal wire could readily be derived from an OR-gate monitoring the various conductors of the bus 102.

When a signal from the bus 102 has been set into the buffer 104, a character-available signal is sent on a character-available wire 106 and passes through an inhibit gate 108 to energize a plurality of gates 110 which are preferably AND-gates and pass the code combination character signal on the output of the buffer 104 to the input of a shift register 112, thereby setting the shift register 112 in accordance with the contents of the buffer 104. It will be noted that the gates 110 differ from the gates 26 of FIG. 1 in that there is no wire corresponding to the wire 30 of the gates 26 of FIG. 1. The gates 110 will thereby set the stages of the shift register 112 in accordance with the buffer 104, as mentioned previously, but the additional or steering bit that is set into the additional stage 114 of the shift register 112 is therefore set to a binary 0 state by the operation of the gates 110. Consequently, that additional bit in the shift register output is a binary 0 bit, thereby indicating that the code combination character being transmitted by the shift register 112 was derived from the control output bus 102.

After the character from the buffer 104 has been set into the shift register 112, timing signals from a clock signal 116 cause the shift register 112 to advance and send the code combination character contained therein, including the bit in the additional stage 114 over a channel 118 to the peripheral portion or keyboard of FIG. 1.

CONTROL IN

Referring now to FIG. 1, the channel 118 is shown entering a shift register 122. When a code-combination character has been completely received by the shift register 122, a character-available signal is sent on a character-available wire 124 to a pair of AND-gates 126 and 128. Since a binary "0" state signal was set into the additional stage 114 of the shift register 112, the corresponding stage 130 of the shift register 122 contains a binary 0 state bit when the characteravailable signal is present on the character-available wire 124. An inverter 132 then provides a binary 1 state signal to the AND-gate 128 which, coupled with the binary 1 state characteravailable signal, causes the AND-gate 128 to issue a trigger or enable signal to a control input buffer register 134 which records the code combination character signal then present on the shift register 122. The binary 0 state bit in the additional stage 130, having served its purpose of steering the code combination character control signal to the buffer 134, is then destroyed. The outputs of the control input buffer 134 are delivered to a control input bus 136 to which is connected a plurality of AND-gates 138, 140, and 142, 144. These four AND-gates are only illustrative of the many possible control functions that could be controlled by signals present on the control bus 136, and the outputs of these AND-gates are labeled in accordance with simple, typical control functions that could be performed in a typical keyboard.

STATUS OUTPUT

In a typical keyboard portion of an elaborate telecommunications terminal, considerable monitoring is accomplished, at the central portion, of the various functions performed at the peripheral portions or for example, the keyboard. One such simple function is to monitor the operation of each lamp on the keyboard to ascertain that the lamp is at least nominally functioning. As a simple illustration of this exemplary monitoring function, referring to FIG. 1, each lamp can have in its circuit a current sensor which generates a binary 1 signal when current of a predetermined magnitude is flowing and also a voltage sensor which generates a binary 1 signal when sufficient voltage is applied across the lamp. The outputs of these sensors are delivered to an exclusive OR-gate 141 of FIG. 1 which generates a binary 0 signal as long as the output from both the current and voltage sensors are the same. However, when a sufficient voltage is applied to the lamp and the current sensor does not sense a sufficient current it delivers a binary 0 state signal to the exclusive OR-gate 141. The exclusive OR-gate 141 then issues a binary "1" state signal on a "lamp No. 1" malfunction wire 143. In an elaborate keyboard, an exclusive OR-gate similar to the exclusive OR-gate 141 could be used to monitor each of the lamps.

All of the exclusive OR-gates similar to the exclusive OR-gate 141 monitoring lamps deliver their outputs to an OR-gate 145 which, in the presence of any binary 1 state signal from any one of the exclusive OR-gates, such as 141, issues a lamp malfunction signal (binary 1 state) on a wire 146 which is connected to a status output bus 148.

As simple examples of the types of status signals that are typically sent via the status output bus 148, several inputs to the status bus 148 are indicated. One such status signal, for example, is a motor ON signal, if the keyboard has a motor, which issues from a centrifugal switch. Other exemplary status signals are: voltage ON and test O.K. Still more examples of inputs to the status output bus 148 indicate that the keyboard is in an operate mode and that the keyboard is in a test mode.

Just as in the case of the control output bus 102 of FIG. 2, the status output bus 148 of FIG. 1 has each of its inputs connected to a single conductor or each input could alternatively be connected to a fan-out gate, which provides a permutation code combination to the conductors of the status output bus 148.

Signals present on the status output bus 148 are delivered to the inputs of a status output buffer register 150 which, like the other buffers, is triggered to receive and store signals from the status output bus 148 in response to either the presence of some binary 1 condition on any one of the conductors of the status output bus 148 or by the application of a character-available signal on a universal conductor of the status output bus 148.

When a code-combination character is present and available in the status output buffer 150, a character-available signal is sent on a wire 152. This character-available signal passes through an inhibit gate 154 to energize a gating circuit 156. This gating circuit 156, for example, comprises a plurality of AND-gates. These AND-gates of the circuit 156 accept the output of the buffer 150 and deliver it to the inputs of the shift register 28.

The character-available signal on the conductor 152 can pass through the inhibit gate 154 as long as there is no inhibiting signal on the wire 32. An inhibit signal on the wire 32 indicates that the shift register is at that instant in the process of transmitting a character over the channel 36. If the shift register 28 is in the process of transmitting a character, the signal on the wire 32 inhibits the inhibit gate 154 from passing the character-available signal to the gates 156. However, as soon as the shift register 28 has completed its transmitting operation and is again in the idle condition, the inhibiting signal is removed from the wire 32 and the inhibit gate 154 passes the characteravailable signal on the wire 152 to the gates 156 in order to load the status code-combination signal then present in the buffer 150 into the shift register 28.

It will be noted that the gates 156 do not furnish the shift register 28 with a binary 1 state bit in the additional bit location or shift register stage corresponding to the wire 30. Therefore, whenever a code-combination character from the buffer 150 is loaded into the shift register 28, that additional stage serviced by the wire 30 - and corresponding to the additional stage 114 of the shift register 112 of FIG. 2 - contains a binary 0 state bit, thereby indicating that a status signal has been loaded into the shift register 28 from the status output buffer 150 rather than a data signal from the buffer 18.

PRIORITY OF COMMUNICATION

It has been explained that if the shift register 28 is in the process of transmitting a code combination character over the channel 36, an inhibiting signal is present on the wire 32 which controls the inhibit gate 154 to prevent a character-available signal from energizing the gates 156. It was also noted earlier, than an inhibit signal on the wire 32 inhibits the gate 24 from passing a character-available signal to the gate 26. The purpose of the inhibit signal on the wire 32 during the transmission of a character by the shift register 28 is to prevent any loss of information that might result from the spurious loading of the shift register 28 while it is in the process of transmitting a previous code-combination character.

In addition, in most systems it is more important that status and control information, that is, supervisory information, be transmitted in preference to data. This is the purpose served by the inhibit gate 22 of FIG. 1. If a status code-combination character signal is available in the buffer 150, the character-available signal on the wire 152 is not only presented to the inhibit gate 154 for energization of the gates 156, but it is also sent to the inhibit input of the inhibit gate 22 in order to preclude a character-available signal on the characteravailable conductor or wire 20 from energizing the gates 26. This assures that if both buffers 18 and 150 are loaded and ready to transmit data and supervisory or status signals, respectively, to the shift register 28, the data signals in the buffer 18 will be delayed by reason of the application of the character-available signal on the wire 152 to the inhibit gate 22 while the supervisory status signal from the buffer 150 is delivered preferentially to the shift register 28. Therefore, data signals from the data buffer 18 can be transmitted on the channel 36 only when the shift register 28 is in the idle condition and the status buffer 150 is empty. Then, and only then, can status signals from the data buffer 18 be loaded into the shift register 28 for transmission on the channel 36.

STATUS INPUT

Referring now to FIG. 2 again, after the status code-combination character is transmitted over the channel 36 to the shift register 40, its additional or steering bit is present on the wire 44. A status code-combination character transmitted over the channel 36 carries a binary 0 state steering bit. When a character-available signal is present on the wire 42, the binary 0 state steering bit or signal is present on the wire 44. The inverter 50 changes this to a binary 1 state bit at the input of the AND-gate 52. The presence of a binary 1 at both of its inputs causes the AND-gate 52 to issue a trigger signal to the status input buffer register 54 which then accepts and stores the status code-combination character from the shift register 40.

The outputs from the buffer register 54 are connected to the status input bus 160 where they are available for a plurality of AND-gates 162, 164, 166, and 168. Referring now to FIG. 1 again, if a binary 1 signal had been present on the wire 146, indicating the malfunction of a lamp, this signal is now present on the status input bus 160 of FIG. 2 and is recognized by the AND-gate 162. The lamp malfunction AND-gate 162 then issues a binary 1 signal on a lamp-malfunction conductor or wire 170.

The lamp malfunction conductor 170 is shown terminating in space and also connected to a "component-alarm" input to a data output bus 172. This interconnection is simplified for easy comprehension. However, it will be apparent to one skilled in the art that the lamp malfunction signal present on the wire 170 is capable of being processed further at the central portion of the terminal. As an example, a lamp-malfunction signal can be used by the central or control portion of the terminal to initiate the illumination of an alternative lamp. Additionally, the term component alarm is broader than the term "lamp malfunction."This is to show that the component alarm operation can also be used by the central or control portion of the terminal to indicate to the keyboard operator a malfunction of any component in addition to a lamp.

The AND-gate 164 can be used to indicate to the circuitry of the central or control portion of the terminal that the operating self-test run by the keyboard test circuitry is satisfactory. This would be useful on a more complicated and elaborate keyboard circuit. The AND-gates 166 and 168 would indicate that the keyboard is in the operating condition or mode or that it is in a standby condition ready to operate.

These four AND-gates are only exemplary of the many possibilities for the communication of supervisory information or status information from the peripheral portion of the terminal to the central or control portion of the terminal, for processing by the central portion of the terminal.

CENTRAL DATA OUT

Still referring to FIG. 2, data can be transmitted by the central portion to the peripheral portion or keyboard of the terminal or to a magnetic tape recorder peripheral portion. An example of such transmission to the keyboard of FIG. 1 is for purposes of lamp illumination. The malfunction signal on the conductor 170 delivered, as mentioned previously, to the data output bus 172 to illuminate a lamp on the keyboard indicating that some component of the entire terminal has malfunctioned. This tells the operator that a service representative must be called for maintenance.

Similarly, as another example of data transmission used for communication to the operator via the keyboard circuitry, an AND-gate (not shown) is used to monitor the operation of the cursor counter 82. This cursor counter monitor issues a binary 1 state signal on a cursor-home conductor or wire 180 whenever the cursor counter is in its zero or reset condition, at which point the cursor manifestation on the screen of the cathode ray tube is in the upper left-hand corner of the raster screen. The binary 1 state signal present on the wire 180 is sent to a cursor-home input of the data output bus 172 and it is also sent to an inverter 182. The output of the inverter 182 is sent to the cursor off-home input of the data output bus 172 to indicate when the cursor leaves the home position.

Any signal present on the data output bus 172 is delivered to the input of a data output buffer register 184. A character-available signal from the data output buffer register 184 is then present on a wire 186 and passes through an inhibit gate 188 and another inhibit gate 190 to cause a plurality of gates 192 to set the data signal from the buffer 184 into the shift register 112.

If, at the time that the data signal is available in the buffer 184, a code combination character is being transmitted by the shift register 112, a signal on a shift register busy wire 192 prevents the inhibit gates 190 and 108 from issuing any signals to their respective gates. Also, if a control supervisory signal is available in the buffer 104, a character-available signal on the characteravailable wire 106 causes the inhibit gate 188 to prevent a signal on the character-available wire 186 from passing through the inhibit gate 188.

If there are no control signal code combinations ready in the buffer 104 and if the shift register 112 is idle, the data code-combination signal buffer 184 sends a character-available signal on the wire 186 through the gates 188 and 190 to the gate 192 setting the data signal code combination into the shift register 112 along with a binary 1 state bit in the additional stage 114 to indicate that a data character is being sent. The data character is then sent over the channel 118 to the peripheral portion or keyboard of FIG. 1.

KEYBOARD DATA INPUT

Referring again to FIG. 1, a data signal on the channel 118 is received by the shift register 122. When the entire code combination character has been completely received, a binary 1 state bit in the stage 130 of the shift register 122 is sent to the AND-gate 126. This input to the gate 126 is coupled with the data-available signal on the wire 124 and causes the AND-gate 126 to issue a trigger signal to a data input buffer register 193 which then stores the data code combination character signal and applies it to a data input bus 194.

A binary 1 state data bit in the stage 130 is inverted by the inverter 132 to deliver a binary 0 signal to the AND-gate 128, thereby preventing the buffer register 134 from being operated.

A data signal code combination on the data input bus 194 is recognized by one of a plurality of AND-gates 195. If the AND-gate 195-1 is energized by the code combination present on the data input bus 194, it delivers a binary 1 signal on a lamp No. 1 ON wire to the set input of a flip-flop 196. This sets the flip-flop 196 to its binary 1 state, which illuminates the lamp No. 1. If, on the other hand, the data signal code combination present on the bus 194 energizes the AND-gate 195-2, that AND-gate sends a binary 1 signal over the lamp No. 1 OFF wire to the reset input of the flip-flop 196. This sets that flip-flop to its binary 0 state which extinguishes the lamp No. 1 on the keyboard. Such circuits are used for all the keyboard lamps.

SUMMARY

Modern digital telecommunications terminals are growing increasingly elaborate and have developed needs for extensive intercommunication of large quantities of data between the various peripheral portions of the terminal and the central portion. With the large number of types of communication involved and the possibility for remote operation of various portions of the circuit, supervisory communication and wiring between the peripheral portions and the central portion can become unbearably complicated and costly.

As disclosed herein, such large amounts of information of various different types can be transported on a simple pair of communications channels by tagging the data and supervisory signals and steering them accordingly as they are received.

Although only one specific embodiment of the invention is shown in the drawing and described in the foregoing specification, it will be understood that invention is not limited to the specific embodiment described, but is capable of modification and rearrangement and substitution of parts and elements without departing from the spirit of the invention.

What is claimed is:

1. An improved telecommunications terminal having a central portion and a peripheral portion, the central portion capable of exercising control over the operation of the peripheral portion by sending control signals to the peripheral portion and the central portion capable of sending data signals to the peripheral portion, the peripheral portion capable of sending status signals and data signals to the central portion, wherein the improvement comprises:

means at the central portion for storing outgoing control signals;

means at the central portion for storing outgoing data signals;

means at the central portion for serializing outgoing control and data signals and for including an indication of the type of signals serialized;

means at the peripheral portion for storing outgoing status signals;

means at the peripheral portion for storing outgoing data signals;

means at the peripheral portion for serializing outgoing status and data signals and for including an indication of the type of signal serialized;

means at the central portion for deserializing incoming status and data signals from the peripheral portion;

means at the central portion for storing the incoming status signals;

means at the central portion for storing the incoming data signals; and means at the central portion for steering the deserialized signals to the status storing means or the data storing means in response to the indication included with the signals.

2. A terminal according to claim 1 further including:

means at the peripheral portion for diserializing incoming control and data signals from the central portion;

means at the peripheral portion for storing the incoming control signals;

means at the peripheral portion for storing the incoming data signals; and means at the peripheral portion for steering the deserialized signals to the control storing means or the data storing means in response to the indication included with the signals.

3. A terminal according to claim 1 wherein the status storing means comprises an incoming status buffer register at the central portion and wherein the data storing means comprises an incoming data buffer register at the central portion.

4. A terminal according to claim 2 wherein the control storing means comprises an incoming control buffer register at the peripheral portion and wherein the data storing means comprises an incoming data buffer register at the peripheral portion.

5. An improved telecommunications terminal having a central portion and a peripheral portion, the central portion capable of sending data signals and control signals to the peripheral portion and the peripheral portion capable of sending data signals and status, wherein the improvement comprises:

a data signal generating device at the peripheral portion capable of producing data signals for transmission to the central portion;

a peripheral data signal send buffer at the peripheral portion for storing the output of the data signal generating device pending clearance to communicate data to the central portion;

a status signal generating device at the peripheral portion capable of producing status signals for transmission to the central portion;

a peripheral status signal buffer at the peripheral portion for storing the output of the status signal generating device pending clearance to communicate the status signal to the central portion;

means at the peripheral portion for adding a signal to the output of the buffers for designating the identity of the buffer communicating a signal to the central portion;

a peripheral send shift register for receiving the output of the buffers and transmitting the signal seriatim to the central portion and following completion of the transmission of a signal for indicating the availability of facility for transmitting additional signals to the central portion;

means responsive to the availability of transmission facility to the central portion for preferentially issuing clearance to the peripheral status signal buffer to communicate a status signal to the central portion, and in the absence of a status signal in the peripheral status signal buffer, for issuing clearance to the peripheral data signal send buffer to communicate a data signal to the central portion;

a central receive shift register at the central portion for receiving signals transmitted seriatim from the peripheral portion;

a central data signal receive buffer for receiving data signals from the central receive shift register;

a central status signal receive buffer for receiving status signals from the central receive shift register;

means responsive to completion of the receipt of a transmitted signal and an identity designating signal within the central receive shift register for enabling the central data signal receive buffer or the central status signal receive buffer to store the contents of the central receive shift register, which buffer is enabled being determined by the identity designating signal;

means at the central portion for utilizing the contents of at least one buffer;

a source of data signals at the central portion capable of producing output data signals for transmission to the peripheral portion;

a data signal output buffer at the central portion for storing the output of the data signal source pending clearance to communicate the data to the peripheral portion;

a source of control signals at the central portion for transmission to the peripheral portion;

a control signal buffer at the central portion for storing the output of the control signal source pending clearance to communicate the control signal to the peripheral portion;

means for adding a signal to the output of the buffers for designating idenfity of the buffer communicating a signal to the peripheral portion;

a shift register for receiving the output of the buffers and transmitting the signal seriatim to the peripheral portion and following completion of the transmission of a signal for indicating the availability of facility for transmitting additional signals to the peripheral portion;

means responsive to the availability of transmission facility to the peripheral portion for preferentially issuing clearance to the control signal buffer at the central portion to communicate a control signal to the peripheral portion, and in the absence of a control signal in the control signal buffer, for issuing clearance to the data signal output buffer to communicate a data signal to the peripheral portion;

a peripheral receive shift register at the peripheral portion for receiving signals transmitted seriatim from the central portion;

a peripheral data signal receive buffer for receiving data signals from the peripheral receive shift register;

a peripheral control signal receive buffer for receiving control signals from the peripheral receive shift register;

means responsive to completion of the receipt of a transmitted signal and an identity-designating signal within the peripheral receive shift register for enabling either the peripheral data signal receive buffer or the peripheral control signal receive buffer to store the contents of the peripheral receive shift register, which buffer is enabled being determined by the identity designating signal; and means at the peripheral portion for utilizing the contents of at least one buffer.

6. A terminal according to claim 5 wherein the signal adding means at the peripheral portion comprises means for controlling one bit of the signal transmitted to the central portion in accordance with the origin of the signal from the peripheral status signal buffer or the peripheral data signal send buffer.

7. A terminal according to claim 6 wherein the controlling means comprises means at the peripheral portion for inserting into the transmitted signal a bit of one binary sense if the outgoing signal came from the peripheral status signal buffer and for inserting into the transmitted signal a bit of the opposite binary sense if the outgoing signal came from the peripheral data signal buffer.

* * * * *